US008550919B2

(12) United States Patent
Kajii

(10) Patent No.: US 8,550,919 B2
(45) Date of Patent: Oct. 8, 2013

(54) GAME CONTROL PROGRAM, GAME DEVICE, GAME SERVER, AND GAME CONTROL METHOD

(75) Inventor: Takeshi Kajii, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 12/744,241

(22) PCT Filed: Jun. 30, 2009

(86) PCT No.: PCT/JP2009/003042
§ 371 (c)(1),
(2), (4) Date: Jul. 8, 2010

(87) PCT Pub. No.: WO2010/041359
PCT Pub. Date: Apr. 15, 2010

(65) Prior Publication Data
US 2011/0190063 A1    Aug. 4, 2011

(30) Foreign Application Priority Data

Oct. 8, 2008 (JP) ................................ 2008-262222
Oct. 8, 2008 (JP) ................................ 2008-262294
Oct. 8, 2008 (JP) ................................ 2008-262295

(51) Int. Cl.
*A63F 9/24* (2006.01)

(52) U.S. Cl.
USPC ............................................ 463/42; 463/43

(58) Field of Classification Search
USPC .................................................... 463/42, 43
See application file for complete search history.

(56) References Cited

U.S. PATENT DOCUMENTS 6,699,127 B1 *   3/2004   Lobb et al. ...................... 463/43
7,500,916 B2 *   3/2009   Lieberman et al. ............. 463/31
(Continued)

FOREIGN PATENT DOCUMENTS

JP       11-194985 A    7/1999
JP     2002219280 A    8/2002
(Continued)

OTHER PUBLICATIONS

International Search Report for Corresponding application PCT/JP2009/003042, dated Sep. 29, 2009.
(Continued)

*Primary Examiner* — David L Lewis
*Assistant Examiner* — Shauna-Kay Hall
(74) *Attorney, Agent, or Firm* — Matthew B. Dernier, Esq.; Gibson & Dernier LLP

(57) ABSTRACT

A game server includes: a multiplayer play request acknowledging unit operative to acknowledge, from a game device of a player, a request for a multiplayer play where a game is played between a game device of a requesting player and a game device of another player; a selection unit operative to select a first mode or a second mode of multiplayer play, the first mode being a mode where a multiplayer play is played with a player accepting the request for a multiplayer play, and the second mode being a mode where a selected player is forced to play in a multiplayer play; a friendly mode matching unit and a hostile mode matching unit operative to refer to a player database storing information on players and select a player to play the requested multiplayer play; and a requesting unit operative to notify the selected player's game device of the selected mode and requests the game device thus notified to start the requested multiplayer play.

14 Claims, 10 Drawing Sheets

(56) References Cited

U.S. PATENT DOCUMENTS

| | | | |
|---|---|---|---|
| 7,530,895 | B2 | 5/2009 | Kigoshi |
| 7,794,315 | B2 * | 9/2010 | Sakaguchi et al. ............ 463/9 |
| 2003/0216184 | A1 | 11/2003 | Kigoshi |
| 2006/0003824 | A1 | 1/2006 | Kobayashi et al. |
| 2007/0111802 | A1 | 5/2007 | Ishihara et al. |
| 2007/0294089 | A1 * | 12/2007 | Garbow et al. ............ 705/1 |
| 2008/0026847 | A1 * | 1/2008 | Mueller et al. ............ 463/42 |
| 2010/0085355 | A1 * | 4/2010 | Nomura ............ 345/419 |
| 2011/0269540 | A1 * | 11/2011 | Gillo et al. ............ 463/31 |

FOREIGN PATENT DOCUMENTS

| | | | |
|---|---|---|---|
| JP | 2002360933 | A | 12/2002 |
| JP | 2003325984 | A | 11/2003 |
| JP | 20048764 | A | 1/2004 |
| JP | 20056766 | A | 1/2005 |
| JP | 2006149671 | A | 6/2006 |
| JP | 200720843 | A | 2/2007 |
| JP | 2007135791 | A | 6/2007 |
| JP | 2007220084 | A | 8/2007 |

OTHER PUBLICATIONS

Written Opinion for Corresponding application PCT/JP2009/003042, dated Sep. 29, 2009.

Kansuru Kiji "Fushigi no Dungeon Furai no Shiren 3 -Karakuri Yashiki no Nemurihime-" Gemaga 2008 Nen 4 Gatsugo, vol. 25/No. 4/ Whole No. 449, p. 93, Apr. 1, 2008.

Shuppan Jigyobu "Ultima Online Koshiki Guide", 1st edition, Softbank Corp. Shuppan Jigyobu, dated Jan. 22, 1998, pp. 90-91, ISBN4-7973-0538-X.

International Preliminary Report on Patentability for Corresponding application PCT/JP2009/003042, dated May 17, 2011.

Office Action for corresponding JP Application 2008-262295, dated Jun. 28, 2011.

Office Action for corresponding JP Application 2008-262222, dated Jun. 28, 2011.

Office Action for corresponding JP Application 2008-262294, dated Aug. 14, 2012.

Office Action for corresponding JP Application 2011182875, Aug. 14, 2012.

Sekaiju no Meikyū 2: Shoō no Seihai, official basic guide, ATLUS Co., Ltd., initial edition, pp. 10-11, Mar. 4, 2008 (see Office Action for JP 2011-182875 for relevance).

Office Action for corresponding JP Application 2008-262222, dated Aug. 14, 2012.

Office Action issued for corresponding Japanese Patent Application No. 2011-182875, dated Jul. 9, 2013.

\* cited by examiner

FIG. 2

| PLAYER ID | AUTHENTICATION DATA | IP ADDRESS | LEVEL | AREA ID | PLAY DATA | GAME OVER POSITION | STATUS |
|---|---|---|---|---|---|---|---|
| 0001 | xxxx | 111.xxx.xxx.1 | 3 | 1 | 0001.dat | (40, 68) | FRIENDLY MODE BEING REQUESTED |
| 0002 | xxxx | 222.xxx.xxx.2 | 1 | 1 | 0002.dat | — | RUNNING NORMAL MODE |
| 0003 | xxxx | 333.xxx.xxx.3 | 6 | 2 | 0003.dat | (82, 26) | RUNNING MATCH UP MODE |
| .. | .. | .. | .. | .. | .. | .. | .. |

| MESSAGE ID | AREA ID | POSITION | PLAYER ID | MESSAGE | EVALUATION |
|---|---|---|---|---|---|
| 0001 | 1 | (12, 50) | 0412 | TRAP IS AHEAD. | +140 |
| 0002 | 1 | (18, 63) | 2293 | ITEM IS LOCATED IN THE LEFT WALL. | +24 |
| 0003 | 1 | (34, 27) | 0805 | ENEMY AHEAD IS TOUGH. | +639 |
| .. | .. | .. | .. | .. | .. |

| EVENT | AREA ID | WB ATTRIBUTE | LR ATTRIBUTE |
|---|---|---|---|
| DEFEAT ENEMY CHARACTER A IN CASTLE | 1 | −10 | |
| DEFEAT ENEMY CHARACTER B IN CASTLE | 1 | | −10 |
| DEFEAT BOSS CHARACTER IN CASTLE | 1 | +50 | +10 |
| : | : | : | : |

FIG. 9

| AREA ID | WB ATTRIBUTE | LR ATTRIBUTE | CONTROL PARAMETER |
|---|---|---|---|
| 1 | +50 OR GREATER | | ENEMY CHARACTER LEVEL +1 |
| 1 | +100 OR GREATER | | ENEMY CHARACTER LEVEL +2 |
| 1 | | +100 OR GREATER | NEGLECTED BY SAINT |
| : | : | : | : |

GAME CONTROL PROGRAM, GAME DEVICE, GAME SERVER, AND GAME CONTROL METHOD

TECHNICAL FIELD

The present invention relates to a game control technology and, more particularly, to a game control program, game device, game server, and game control method configured to control a game played by multiple players.

BACKGROUND ART

Match-up games that use a network are gaining popularity. Players can find an opponent in a match-up using a matching function provided by a server and enjoy a match-up game.

SUMMARY OF THE INVENTION

In network-based match-up games, one can experience enjoyment that cannot be experienced in a single player play. The down side of network games is that one cannot advance the game at one's own pace.

The present invention addresses this drawback and a purpose thereof is to provide a game control technology capable of providing increased entertainment value.

One embodiment of the present invention relates to a game control program product. The game control program product comprises: a module operative to request a game server managing multiplayer play to select a player with which to play a multiplayer play where a game is played between a game device of a requesting player and a game device of another player; a module operative to select a first mode or a second mode of multiplayer play and notify the game server accordingly, the first mode being a mode where a multiplayer play is played with a player accepting the request for a multiplayer play, and the second mode being a mode where a selected player is forced to play in a multiplayer play; and a module operative to receive notification of a player with which to play a multiplayer play from the game server and control the requested multiplayer play with a game device of the player designated by the notification.

Another embodiment of the present invention also relates to a game control program product. The game control program product comprises: a module operative to acknowledge, from a game device of a player, a request for a multiplayer play where a game is played between a game device of a requesting player and a game device of another player; a module operative to select a first mode or a second mode of multiplayer play, the first mode being a mode where a multiplayer play is played with a player accepting the request for a multiplayer play, and the second mode being a mode where a selected player is forced to play in a multiplayer play; a module operative to refer to a player database storing information on players and select a player to play the requested multiplayer play; and a module operative to notify the selected player's game device of the selected mode and requests the game device thus notified to start the requested multiplayer play.

Still another embodiment of the present invention also relates to a game control program product. The game control program product comprises: a module operative to control a game where a player controls a player's character and advances in a game field; a module operative to acquire play data of another player or a message, from a game server adapted to manage the play data and the message, the play data indicating the status of progress of the game in the game field, and the message being directed to another player displayed in the game field; and a module operative to display the play data or the message when the player's character is located within a predetermined range from a position where the play data or the message is registered.

Yet another embodiment of the present invention also relates to a game control program product. The game control program product comprises: a module operative to acquire, from a game device adapted to control a game where a player controls a player's character and advances in a game field, play data indicating the status of progress of the game in the game field or a message directed to another player displayed in the game field; a module operative to refer to a player database storing information on positions of the player's characters of a plurality of game devices in the game field and to select a player that controls a player's character located within a predetermined range from a position in the game field where the play data or the message should be displayed; and a module operative to deliver the play data or the message to the game device of the selected player.

Optional combinations of the aforementioned constituting elements, and implementations of the invention in the form of methods, apparatuses, and systems may also be practiced as additional modes of the present invention.

The present invention provides a game control technology capable of providing increased entertainment value.

BRIEF DESCRIPTION OF THE DRAWINGS

FIG. 2 shows exemplary data stored in a player database;

FIG. 3 shows exemplary data stored in a message database;

FIG. 8 shows exemplary data stored in a tallying condition storage unit;

FIG. 9 shows exemplary data stored in a change condition storage unit;

Figure 1:
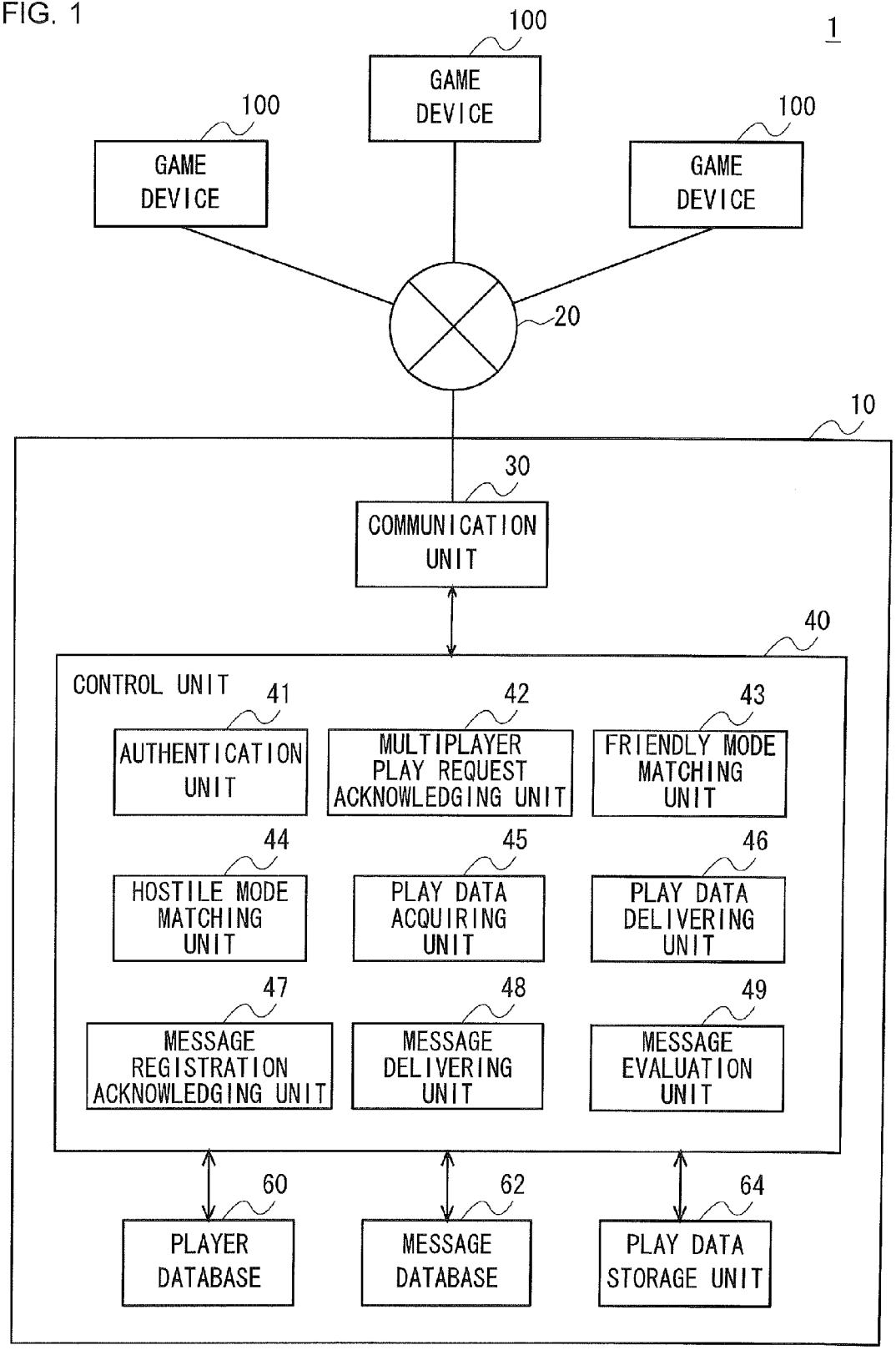
FIG. 1 shows the configuration of a game system according to an embodiment.

DETAILED DESCRIPTION OF THE PREFERRED EMBODIMENTS (First Embodiment)

A description will be given of a technology according to an embodiment that provides the function of allowing players playing a game in parallel to exercise influence to each other directly or indirectly. To describe the embodiment, a role playing game will be discussed by way of example where a player controls a player's character in a hope to achieve a certain goal, traveling in a game field formed of multiple areas, fighting with an enemy character, picking up an item, clearing an event, etc.

When a player's character dies by, for example, being defeated by an enemy character before achieving the goal, the game is re-started at a certain point in an area with the item that had been acquired being lost and the level of physical strength being reduced to half. The game server provides a means to allow the player to re-start the game without losing an item and so on. In other words, the player can seek relief from the game server to restore the player's character. The game server provides two methods of relief. One method is to allow the player to cooperate with a player to give relief and advance the game accordingly so that the player's character is restored by achieving the goal and clearing the area. Such a method will be referred to as "friendly mode". Another is to restore the player's character by fighting with a player's character of a player to give relief and defeating the player. Such a method will be referred to as "hostile mode".

In the case of friendly mode, the game server requested by a player to relieve the player's character recruits a player to give relief. When a player to give relief is found, the player's character of the player to give relief is located in the game field of the player that requested the relief. In the case of hostile mode, the game server automatically selects a player to give relief and causes the player's character of the requesting player to enter the game field of the selected player. A player can choose from either of the methods when the player's character dies and attempt to restore the player's character accordingly.

A player can play the game independently without connecting to the game server. By connecting to the game server to play the game, the player is given an opportunity to enjoy a multiplayer play with other players, as described above. Since a multiplayer play in the friendly mode does not occur unless the player requests relief or accepts to give relief to someone else, the player can enjoy a multiplayer play on its own pace. Sometimes, another player unexpectedly enters the player's field in the hostile mode. Therefore, the player can enjoy the playful tension.

The embodiment further provides various functions designed to help players to communicate with each other indirectly. For example, the play data of another player may be played back while the game is in progress, the position where the game was over for another player may be displayed, a message for other players may be left in the field, or a message left by another player is displayed. In this way, each player can collect information that serves as a hint to the progress of the game so that the convenience for the players is improved. By seeing other players' situations or viewing messages from them, sense of solidarity is created among players, bringing refined enjoyment to the players.

FIG. 1 shows the configuration of a game system 1 according to the embodiment. In the game system 1, a game device 100 that allows a player to play a game, and a server 10 controlling the game run in multiple game devices 100 are connected by a network such as the Internet 20. The device 100 and the game server 10 exchange data via the Internet 20.

The game server 10 is provided with a communication unit 30, a control unit 40, a player database 60, a message database 62, and a play data storage unit 64. The configuration is implemented, in hardware components, by any CPU of a computer, a memory, and in software by a program or the like loaded into the memory. FIG. 1 depicts functional blocks implemented by the cooperation of hardware and software. Therefore, it will be obvious to those skilled in the art that the functional blocks may be implemented in a variety of manners by hardware only, software only, or a combination of thereof.

The player database 60 stores information on players utilizing the service provided by the game server 10. FIG. 2 shows exemplary data stored in the player database 60. The player database 60 is provided with a player ID column (fields) 70, an authentication data column (fields) 71, an IP address column (fields) 72, a level column (fields) 73, an area ID column (fields) 74, a play data column (fields) 75, a game over position column (fields) 76, and a status column (fields) 77. The player ID fields 70 store player IDs. The authentication fields 71 store data for authenticating the associated players. The IP address fields 72 store the IP addresses of the game devices of the associated players. The level fields 73 store the levels of the players' characters of the associated players. The area ID fields 74 store the IDs of the areas of the game fields in which the associated players are playing. The player data fields 75 store the name of the data files storing the play data of the associated players. The game over position fields 76 store the positions where the players' characters of the associated players die. The status fields 77 store the status of the associated players in the game. The status may be "running normal mode", "requesting friendly mode", "running friendly mode", "requesting hostile mode", "running hostile mode", etc.

The message database 62 stores messages registered by players. FIG. 3 shows exemplary data stored in the message database 62. The message database 62 is provided with a message ID column (fields) 80, an area ID column (fields) 81, a position column (fields) 82, a player ID column (fields) 83, a message column (fields) 84, and an evaluation column (fields) 85. The message ID fields store the IDs of messages. The area ID fields 81 store the IDs of the areas of the game fields in which the associated messages are registered. The position fields 82 store the positions in the areas in which the associated messages are registered. The player ID fields 83 store the IDs of the players registering the associated messages. The message fields 84 store the content of the associated messages. The evaluation fields 85 store the evaluation given to the associated messages by other players.

The authentication unit 41 authenticates the player attempting to connect to the game server 10. When the authentication unit 41 is requested by the game device 100 of the player to authenticate the device 100 for connection, the unit 41 demands the ID and authentication data from the player. The unit 41 refers to the player database 60 and authenticates the player ID and the authentication data thus acquired. When the player ID is not registered in the player database 60, the authentication unit 41 acknowledges a request for registration from the player and registers the player ID and the authentication data in the player database 60. When the authentication is successful, the authentication unit 41 acquires the IP address of the game device 100 and registers the address in the player database 60. The unit 41 also acquires the level of the player and the ID of the area in which the player is playing and registers them in the player database 60.

A multiplayer play request acknowledging unit 42 acknowledges a request for a multiplayer play from the game device 100 of the player. As mentioned before, the embodiment provides for a multiplayer play as a means of relief when the player's character dies. The multiplayer play request acknowledging unit 42 acknowledges a request for a multiplayer play in the friendship mode or in the hostile mode from the game device 100 of the player requesting the restoration of the dead player's character.

When the multiplayer play request acknowledging unit 42 acknowledges a request for a multiplayer play in the friendly mode, a friendly mode matching unit 43 selects a player with which the requesting player plays a multiplayer play. The friendly mode matching unit 43 acquires the level and the area ID of the player requesting a multiplayer play in the friendly mode from the player database 60. The unit 43 searches the player database 60 for players playing in the same area and having a similar level. The friendly mode matching unit 43 selects players according to a predetermined condition or in a random fashion from the players identified by the search. The unit 43 transmits to the game devices 100 of the selected players data for inviting the selected players to a multiplayer play in the friendly mode. The friendly mode matching unit 43 determines a partner in the multiplayer play from the game devices 100 invited to the multiplayer play and accepting the invitation to the multiplayer play. The friendly mode matching unit 43 transmits, to the game device 100 of the player thus determined and to the game device 100 of the requesting player, the IP addresses of each other's game devices 100.

For the purpose of increasing the likelihood of success of relief of the player's character in the friendly mode, a player having a higher level than the player requesting the relief may be selected as the one to give relief. In this way, the convenience for the player is improved. Conversely, a player having a lower level than the player requesting the relief may be selected as the one to give relief. In this way, the difficulty of the game is maintained at a high level and the enjoyment of the game is improved.

When the multiplayer play request acknowledging unit 42 acknowledges a request for a multiplayer play in the hostile mode, a hostile mode matching unit 44 selects a player with which the requesting player plays a multiplayer play. The hostile mode matching unit 44 acquires the level and the area ID of the player requesting a multiplayer play in the hostile mode from the player database 60. The unit 44 searches the player database 60 for players playing in the same area and having a similar level. The hostile mode matching unit 44 selects players according to a predetermined condition or in a random fashion from the players identified by the search. The unit 44 notifies the game device 100 of the selected player of the start of a multiplayer play in the hostile mode. In other words, in the case of the hostile mode, the player's character of the requesting player enters the game field of the requested player regardless of whether the requested player likes it or not, whereupon a multiplayer play is started. The hostile mode matching unit 44 transmits, to the game device 100 of the requested player and to the game device 100 of the requesting player, the IP addresses of each other's game devices 100.

For the purpose of increasing the likelihood of success of relief of the player's character in the hostile mode, a player having a lower level than the player requesting the relief may be selected as an opponent. In this way, the convenience for the player is improved. Conversely, a player having a higher level than the player requesting the relief may be selected as an opponent. In this way, the difficulty of the game is maintained at a high level and the enjoyment of the game is improved.

The friendly mode matching unit 43 or the hostile mode matching unit 44 may select multiple players as players in a multiplayer play. In this case, an upper limit may be set to the number of players that can participate in a multiplayer play in order to reduce the processing load of the game device 100 or the congestion in communication.

When a player in a multiplayer play is determined, exchange of data between the game devices 100 participating in a multiplayer play may be mediated by the game server 10. Alternatively, the data may be exchanged using P2P communication between the game devices 100. In the latter case, the data may be directly exchanged between the participating game devices 10. Alternatively, a given game device 100 (e.g., the game device 100 originating the request) may serve as a host to mediate data exchange between the game devices 100.

A play data acquiring unit 45 acquires data indicating the status of the game being run from the game device 100 of the player and stores the data in the play data storage unit 64. The play data acquired may be moving image data capturing screen images and sound of the game being run, or data indicating the history of player control, or control parameters of the game. Alternatively, the play data may be replay data comprising coordinate data indicating the position of the player's character and data indicating the orientation of the player's character as recorded frame by frame or at intervals of a predetermined number of frames. What is essential is that the play data thus acquired can be played back in the game device 100 of another player. The play data includes data generated when the player's character is defeated to death by an enemy.

A play data delivering unit 46 delivers the play data stored in the play data storage unit 64 to the game device 100 of the player according to a predetermined timing schedule. The play data delivering unit 46 may read the play data stored in the play data storage unit 64, select the game device 100 that should receive the play data, and deliver the data accordingly. Alternatively, the game device 100 may first determine the game device 100 that should receive the play data, then select the play data that should be delivered to the device 100 thus determined, and deliver the data accordingly.

In the former case, the play data delivering unit 46 selects and reads the play data stored in the play data storage unit 64 according to a certain condition or in a random fashion. Subsequently, the play data delivering unit 46 refers to the player database 60, acquires the level and area ID of the player transmitting the play data thus read, and searches the player database 60 for players playing in the same area and having a similar level. Of the players identified by the search, the play data delivering unit 46 selects a player to deliver the data to according to a predetermined condition or in a random fashion. The unit 46 acquires the IP address of the game device 100 of the selected player and transmits the play data accordingly.

In the latter case, the play data delivering unit 46 selects the game device 100 to deliver the play data to according to a predetermined condition or in a random fashion. Subsequently, the play data delivering unit 46 refers to the play database 60, acquires the level and area ID of the player of the game device 100 thus selected, and searches the player database 60 for players playing in the same area and having a similar level. Of the players identified by the search, the play data delivering unit 46 selects a player according to a predetermined condition or in a random fashion. The unit 46 reads the play data of the selected player from the play data storage unit 64 and transmits the data accordingly.

The play data delivering unit 46 may deliver the play data to the game device 100 periodically, deliver the data to the game device 100 of the other players when the play data acquiring unit 45 acquires the play data, or deliver the play data in an area collectively when the player starts playing in the area. The play data delivering unit 46 may provide an upper limit to the number of game devices 100 to collectively deliver the play data to, for the purpose of reducing the load of the game server 10.

A message registration acknowledging unit 47 acknowledges a request for registration of a message from the game device 100 and registers the message thus acknowledged in the message database 62. In addition to the content of the message, the message registration acknowledging unit 47 acquires from the game device 100 the ID of and position in the area in which to register the message and registers the ID and position in the message database 62.

A message delivering unit 48 delivers the message registered in the message database 62 to the game device 100 of the player. When a player starts playing in an area, the message delivering unit 48 reads the message registered in the area from the message database 62 and delivers the message content and data indicating the position of registration to the recipient game device 100. This allows the game device 100 to display the message in the game field. The message delivering unit may additionally read the ID of the player registering the message or the evaluation of the message from the message database 62 and deliver it to the game device 100. This allows the player to evaluate the reliability of the registered message in an objective manner.

An upper limit to the number of messages delivered may be set in consideration of the load of the game device 100. The message delivering unit 48 may select a message to deliver by allowing for the level of the player registering the message and the level of the player to deliver the message to. For example, the unit may preferentially select a message registered by a player having a level different from that of the recipient player by a predetermined amount or less. This allows providing the player with a message such as a hint left by a player of a similar level so that the convenience for the player is improved.

A message evaluation unit 49 evaluates the message registered in the message database 62. The message evaluation unit 49 may acquire the evaluation of the message from the game device 100 when the registered message is delivered to the game device 100. The message evaluation unit 49 calculates a numerical score indicating the evaluation of the message and registers it in the message database 62.

Figure 4:
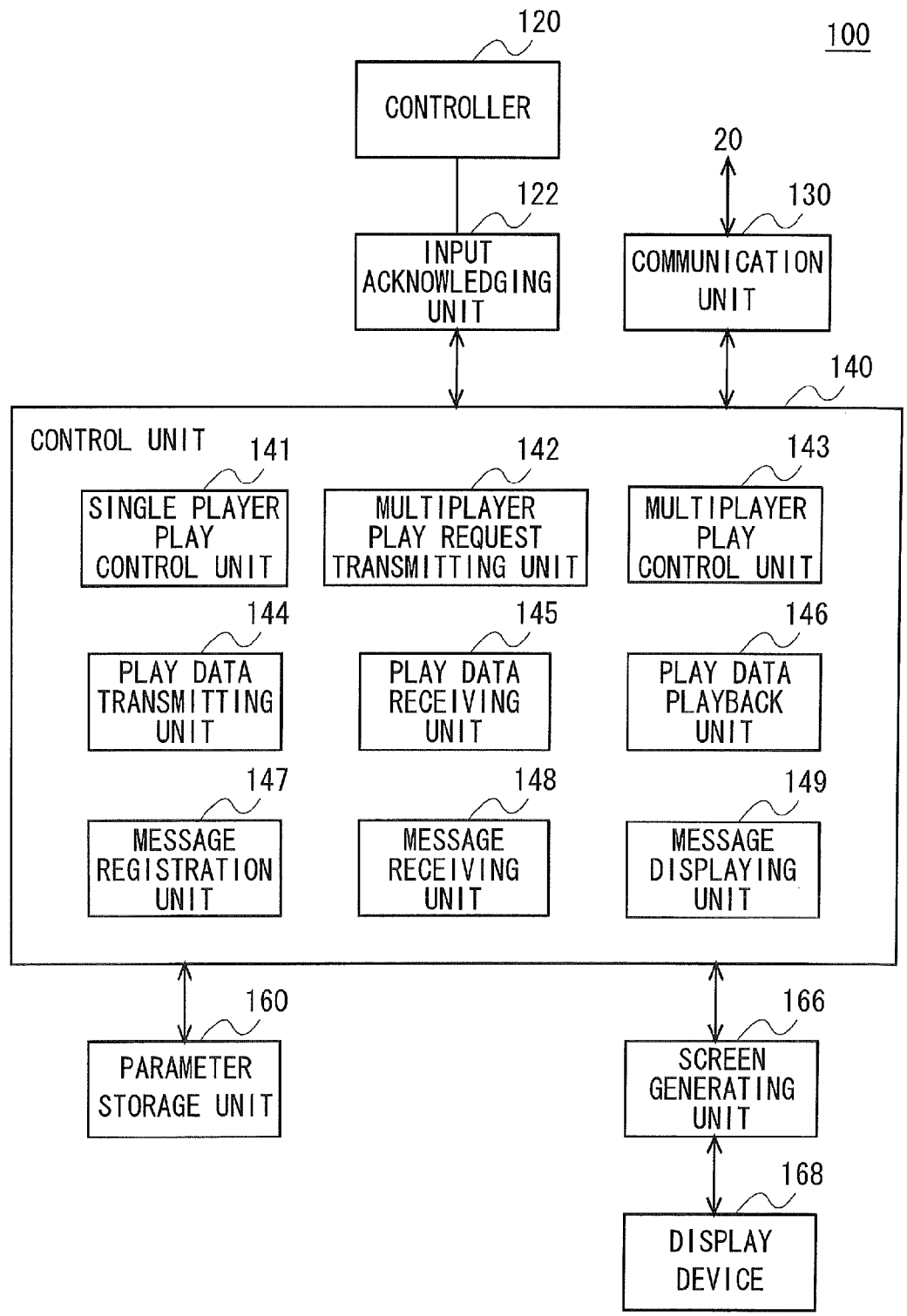
FIG. 4 shows the configuration of a game device according to the embodiment.

FIG. 4 shows the configuration of the game device 100 according to the embodiment. The game device 100 is provided with a controller 120, an input acknowledging unit 122, a communication unit 130, a control unit 140, a parameter storage unit 160, a screen generating unit 166, and a display device 168. The components may be implemented in a variety of manners by hardware only, software only, or a combination of thereof.

The input acknowledging unit 122 acknowledges a control signal from the controller 120 controlled by the player. The control unit 140 moves the player's character in an area forming the game field based on a control input from the player acknowledged by the input acknowledging unit 122 so as to advance the game. The parameter storage unit 160 stores various parameters necessary to advance the game such as the position of the player's character and an event flag. The screen generating unit 166 generates a screen of the game controlled by the control unit 140 and causes the display device 168 to display the screen. The communication unit 130 controls communication with the game server 10 via the Internet 20.

A single player play control unit 141 runs the game program and controls the game in the normal mode played by a single player. The single player play control unit 141 moves the player's character in an area and controls the execution of a battle with an enemy character or of an event. The single player play control unit 141 manages acquisition, disposal, and use of an item, as well as controlling increase/decrease of the physical strength level of the player's character. When the physical strength level of the player's character becomes zero, the unit deletes the item in possession of the player, sets the physical value level to half the maximum value, moves the player's character to a predetermined position in the area where the player played, and re-starts the game.

A multiplayer play request transmitting unit 142 transmits data requesting a multiplayer play with another player to the game server 10. As mentioned before, a multiplayer play is called for the purpose of restoring a dead player's character. The multiplayer play request transmitting unit 142 may request the game server 10 to run a multiplayer play when the player's character dies while the single player play control unit 141 is running a single player play. Alternatively, the unit 142 may request the game server 10 to run a multiplayer play when the game is re-started and then the player requests a multiplayer play by, for example, using an item for requesting a multiplayer play. The multiplayer play request transmitting unit 142 acknowledges a request from the player for a multiplayer play in the friendly mode or for a multiplayer play in the hostile mode. The unit 142 notifies the game server 10 of the mode of multiplayer play.

A multiplayer play control unit 143 controls a multiplayer play with the game device 100 with which to play the requested multiplayer play. The multiplayer play control unit 142 runs the requested multiplayer play with the game device 100 notified by the game server 10. A multiplayer play may be started when the player controls the multiplayer play request transmitting unit 142 to request the game server 10 to offer a multiplayer play in the friendly mode or in the hostile mode. A multiplayer play may alternatively be started when the player accepts an invitation to a multiplayer play in the friendly mode from another player, or when the player's character of another player comes entering the field for a multiplayer play in the hostile mode initiated by the entering player.

When the multiplayer play request transmitting unit 142 of a device requests the start of a multiplayer play in the friendly mode, the multiplayer play control unit 143 of the requesting device terminates the multiplayer play when the player's character achieves a predetermined goal in the area. In this case, the player's character once dead is restored and the game is returned to a single player play. In the hostile mode, the multiplayer play control unit 143 terminates the multiplayer play when the player's character wins a battle with the player's character of the player in the multiplayer play. In this case, the player's character once dead is restored and the game is returned to a single player play. Second death of the player's character in a multiplayer play is processed in the same manner as death of the player's character in a single player play.

A play data transmitting unit 144 transmits the play data occurring in the game to the game server 10 at a predetermined timing schedule while the game is running. The play data transmitting unit 144 may transmit the play data periodically, i.e., at predetermined time intervals. Alternatively, the unit 144 may transmit the play data when a predetermined trigger (e.g., occurrence of an event or clearing) is generated.

A play data receiving unit 145 receives the play data of another game device 100 from the game server 10. A play data playback unit 146 plays back the play data of another game device 100 received by the play data receiving unit 145. For example, when the play data receiving unit 145 receives the play data comprising coordinate data indicating the position of the player's character of another game device 100 and data indicating the orientation of the player's character as recorded frame by frame, the play data playback unit 146 reads shape data of the player's character by referring to the data indicating the orientation so as to generate an image of the player's character and place the image on the game field by referring to the coordinate data.

The play data playback unit 146 may play back the received play data when the play data receiving unit 145 receives the play data. Alternatively, the unit 146 may store the play data received in the parameter storage unit 160 and reads the data from the parameter storage unit 160 and plays back the data accordingly when the player's character passes the position where the play data is recorded. This allows the player to feel the other player is playing in parallel and develop the sense of solidarity. Therefore, the enjoyment of the game is improved. Further, the player is provided with guidance to advance the game, by playing back the play of another player. Therefore, the convenience for the player is improved.

When the play data playback unit 146 receives data indicating the position where the player's character of another player dies, the unit 146 displays a mark (e.g., blood mark) at the associated position in the game field. When the player's character approaches the mark, the play data playback unit 146 inquires the player whether to play back the play data associated with the blood mark. When the unit 146 receives an instruction to play back the data, the unit 146 reads the associated play data from the parameter storage unit 160 and plays back the data. This allows the player to know where the game was over for another player and in what situation the game was over. Therefore, the convenience for the player is improved.

A message registration unit 147 acknowledges a request to register a message from the player and requests the game server 10 to register the message. The message registration unit 147 presents a screen to enter a message when the unit 147 acknowledges a request to register a message from the player. A template of the message may be stored in the parameter storage unit 160 so that the template is presented to acknowledge the entry of a message. Alternatively, a free text may be acknowledged. The message registration unit 147 transmits to the game server 10 the message thus acknowledged, the area ID in the game field in which to display the message, and information indicating the position in the area.

A message receiving unit 148 receives a message registered in the game server 10 from the game server 10. The message receiving unit 148 may receive the message registered in the area before the player's character enters the area. Alternatively, the unit 148 may receive the message according to a predetermined timing schedule while the game is in progress. The message receiving unit 148 stores the received message in the parameter storage unit 160.

A message displaying unit 149 displays the message received by the message receiving unit 148. When the screen generating unit 166 generates a screen, the message displaying unit 149 reads the position where the message is registered from the parameter storage unit 160 and notifies the unit 166 accordingly. When the screen generated by the screen generating unit 166 includes the position where the message is registered, an icon or the like indicating that the message is registered is displayed in the neighborhood of the position. When the message displaying unit 149 acknowledges a request to display the message from the player, the unit 149 reads the associated message from the parameter storage unit 160 and displays the message. This allows the player to read a message left by another player. Therefore, the player is provided with guidance to advance the game and the convenience for the player is improved. Conventionally, information exchange between players is done via a bulletin board dedicated for the purpose. By providing the function to allow messages to be exchanged within the game, however, the player is capable of reading messages without taking the trouble of opening a bulletin board while the game is in progress and reading messages related precisely to the position in the game. Therefore, the convenience is further improved. The message displaying unit 149 may display only those messages evaluated at a level higher than a predetermined value. This improves the reliability of the message.

After presenting the message to the player, the message displaying unit 149 acknowledges evaluation of the message from the player and transmits the evaluation to the game server 10. Many of the messages displayed relate to the game field ahead the point where the message is displayed. In this case, however, the player cannot evaluate the reliability of the message when the message is displayed. Therefore, the message displaying unit 149 may acknowledge from the player the evaluation of the message displayed in the past, when the player reaches a predetermined point in the game field or clears the area. In this way, the reliability of the message can be accurately reflected in the evaluation.

Figure 5:
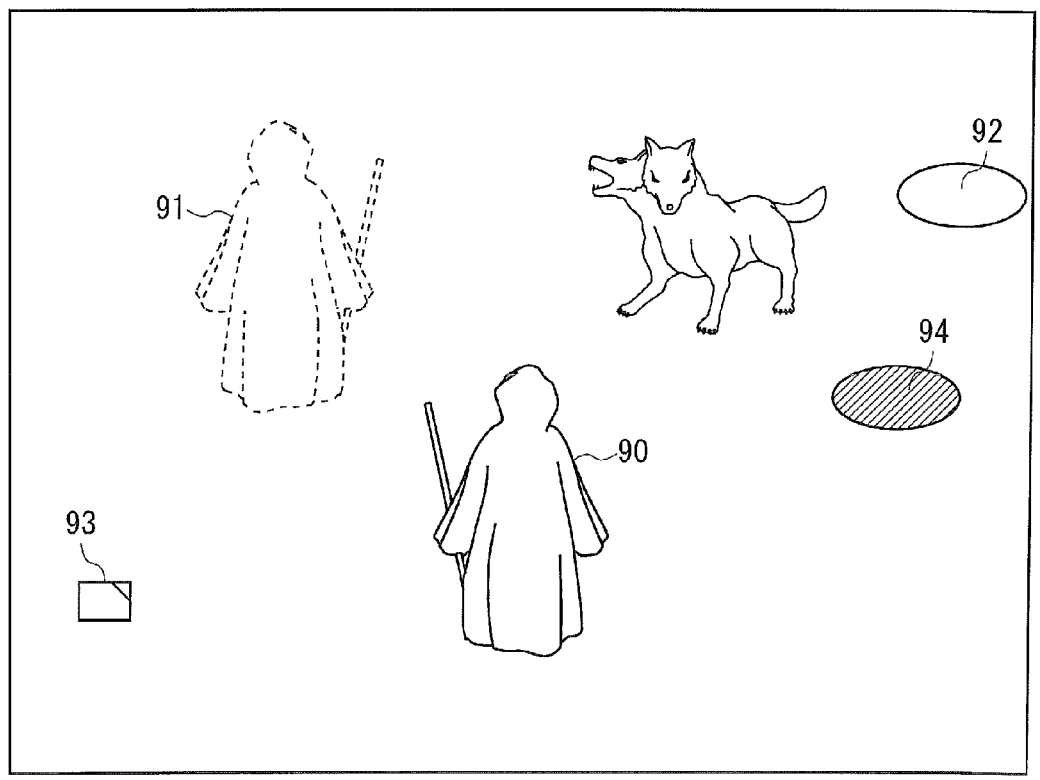
FIG. 5 shows an exemplary screen displayed by the display device.

FIG. 5 shows an exemplary screen displayed by the display device 168. In addition to a player's character 90 and an enemy character, the screen shows a player's character 91 of another player, a blood mark 92 indicating the position where the other player's character dies, an icon 93 indicating a message left by the other player, and a blood mark 94 indicating that the other player is requesting a multiplayer play in the friendly mode.

The play data playback data 146 plays back the play data of the other player in, for example, a semi-transparent fashion so that the player's character 91 of the other player is visually distinguished from the player's character 90 of the player's device.

When the player's character 91 approaches the blood mark 92, the play data playback unit 146 inquires the player whether the play data generated when the player's character associated with the blood mark 92 died should be played back. When the player requests that the data be played back, the play data playback unit 146 reads the play data from the parameter storage unit 160 and plays back the data.

When the player's character 91 approaches the icon 93 indicating the message, the message displaying unit 149 inquires the player whether the message associated with the icon should be displayed. When the player requests that the message be displayed, the message displaying unit 149 reads the message from the parameter storage unit 160 and displays the message. In this process, the unit 149 may request the player to provide an evaluation of the message. The evaluation of the message provided by the player is transmitted by the message registration unit 147 to the game server 10.

When the player's character 91 approaches the blood mark 94, the multiplayer play control unit 143 inquires the player whether the player accepts invitation to a multiplayer play in the friendly mode. When the player requests a multiplayer play, the multiplayer play control unit 143 notifies the game server 10 of the acceptance of the invitation to a multiplayer play. Upon being notified by the game device 10 of the IP address of the game device 100 of the other player in the requested multiplayer play, the multiplayer play control unit 143 starts the requested multiplayer play.

Services are widely used that provide a game field where multiple players can play a game simultaneously and in parallel via a network. Examples of network games include games where multiple players match up or games where multiple players cooperate to advance a game toward a certain goal.

However, the vivid pleasure of a game may be lost as the game is played repeatedly because the game itself remains unchanged even if the opponent in a match or the partner in cooperation changes. There is called for a technology to introduce a change in a game in order to prevent a user from feeling bored playing the game.

The present invention addresses this goal and a purpose thereof is to provide a game control technology capable of providing increased entertainment value.

One aspect of the second embodiment relates to a game control program product. The game control program product comprises: a module operative to communicate with game terminals of a plurality of players; a module operative to acquire a first parameter that varies with the progress of a game from the game terminals; a module operative to tally the first parameters from the game terminals in accordance with a tallying condition stored in a condition storage unit and calculate a second parameter indicating the overall pattern of the plurality of players; and a module operative to communicate a change of a third parameter for controlling the game to the game terminals, in accordance with a change condition stored in the condition storage unit and based on the second parameter thus calculated.

Another aspect of the second embodiment also relates to a game control program product. The game control program product comprises a module operative to control the progress of a game; a module operative to transmit a parameter that varies with the progress of the game to a game server adapted to manage a plurality of game terminals; a module operative to receive notification of a change of a parameter for controlling the game from the game server; and a module operative to change a parameter used by the module for controlling the progress of the game to control the game, in accordance with the notification of a change thus received.

Optional combinations of the aforementioned constituting elements, and implementations of the invention in the form of methods, apparatuses, and systems may also be practiced as additional modes of the present invention.

The second embodiment provides a game control technology capable of providing increased entertainment value.

(Second Embodiment)

A description will be given of a technology according to the second embodiment whereby the game server for management of a game played by multiple players acquires and tallies event information (an example of the first parameter that varies with the progress of the game) from the game terminals of the multiple players playing the game, calculates an attribute (an example of the second parameter indicating the pattern of the game world as a whole built by the game server), and changes a control parameter (an example of the third parameter for controlling the game in the game terminals) in accordance with the attribute thus calculated.

The attribute of the game world as a whole indicates "atmosphere" or "pattern" of the game world built by multiple participating players. The attribute reflects the way the game is advanced by the players connected to the game server, the progress of the game, the content, level, and nature of events, etc. For example, if there are a lot of players in a role playing game attempting to advance the game by cooperating with a friendly character and defeating an evil enemy character, the sense of justice prevails in the game world as a whole. In this case, the levels of friendly characters are increased, or a large number of valuable items are placed in the field, etc. Conversely, if there are a lot of players attempting to advance the game by diminishing a friendly character and cooperating with an evil enemy character, an evil atmosphere prevails in the game world as a whole. In this case, more evil enemy characters will present themselves, or items not available in a normal scenario are placed in the field, etc.

Since each player advances the game under the influence from multiple other players playing the game simultaneously and in parallel, the player can feel a sense of involvement and experience the pleasure that cannot be experienced in related-art games. Further, since the status of each player in the game is changed in accordance with the attribute of the game world as a whole, the player can experience a game that is rich in variations.

Figure 6:
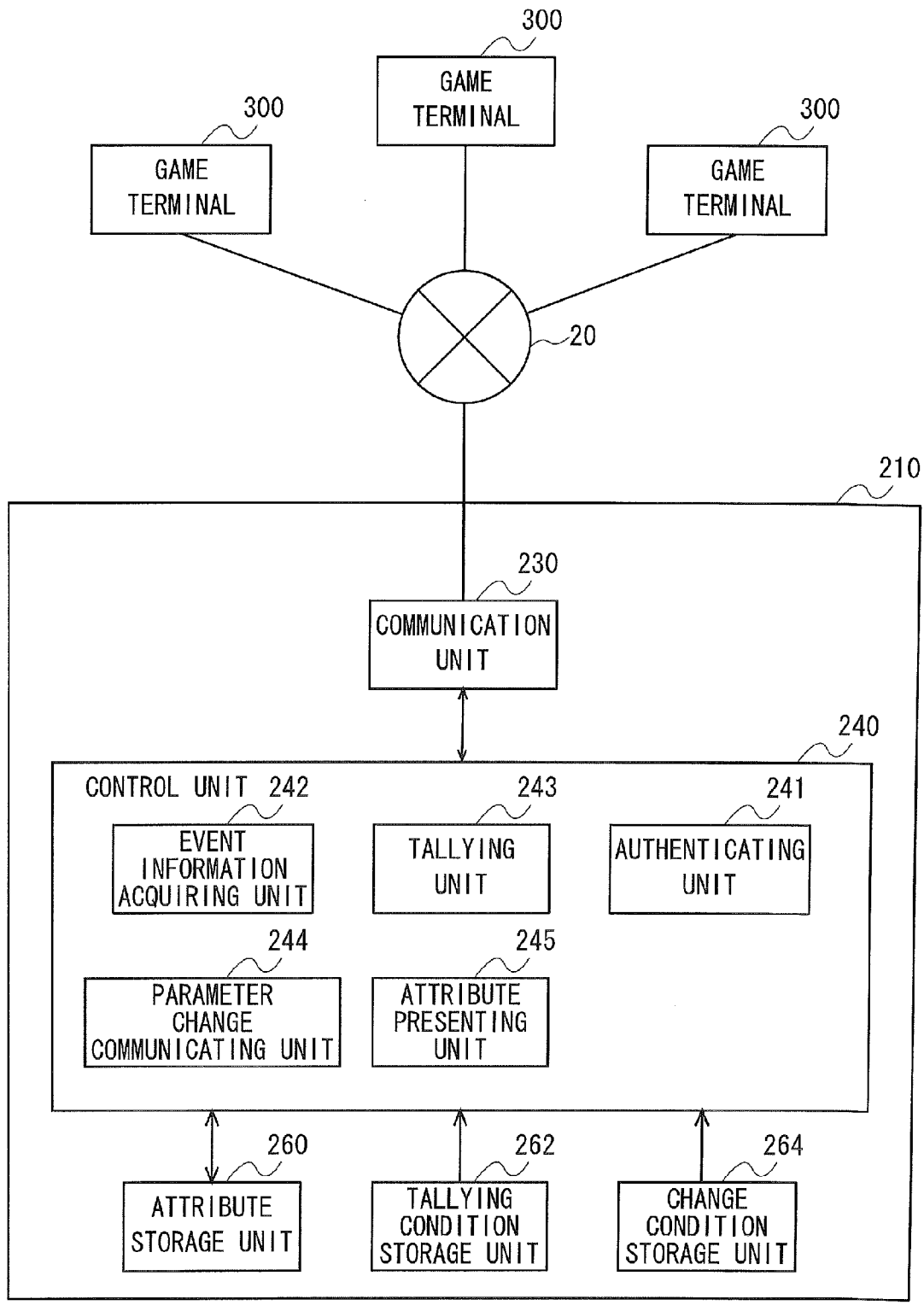
FIG. 6 shows the configuration of a game server according to the embodiment.

FIG. 6 shows the configuration of a game server 210 according to the embodiment. The game server 210 is provided with a communication unit 230, a control unit 240, an attribute storage unit 260, a tallying condition storage unit 262, and a change condition storage unit 264. The configuration is implemented, in hardware components, by any CPU of a computer, a memory, and in software by a program or the like loaded into the memory. FIG. 1 depicts functional blocks implemented by the cooperation of hardware and software. Therefore, it will be obvious to those skilled in the art that the functional blocks may be implemented in a variety of manners by hardware only, software only, or a combination of thereof.

In this embodiment, each game terminal 300 runs a role playing game. A role playing game comprises multiple areas. When the player clears an area, the player is capable of moving to the next area. When the player logs into the game server 210 via the game terminal 300 before playing an area, the player is presented by the game server 210 with the current attribute of the area in the game world as a whole. When the player does not wish to play in the game world with the attribute thus presented, the player can log off from the game server 210 and play on an individual basis.

When the player chooses to play in the game world, the game server 210 determines control parameters of the area based on the current attribute of the area and the attribute of the player itself, and communicates the parameters thus determined to the game terminal 300. The game terminal 300 controls the game based on the control parameters thus communicated. This allows the player to enjoy the game in which the attribute of the game world as a whole built by the game server 210 is reflected. The game terminal 300 transmits information on an event generated while the game is in progress to the game server 210. The game server 210 calculates and records the attribute of the player by referring to the event information thus retrieved and causes the attribute to be reflected in the attribute of the game world as a whole. In this way the attribute of the game world as a whole varies minute by minute in accordance with events generated by individual players so that a change is introduced in the game.

A description will now be given of the operation of individual functional blocks with reference to FIG. 6. The communication unit 230 exchanges data with the game terminal 300 of the player via the Internet 20, which is an example of a network.

The attribute storage unit 260 stores attributes calculated by tallying the parameters retrieved from the game terminals of the players. As described below, according to the embodiment, the game parameters are changed in consideration of both the attributes of individual players and the attribute of the game world as a whole. Therefore, the attribute storage unit 260 stores the attribute of the whole and those of individual players.

Figure 7:
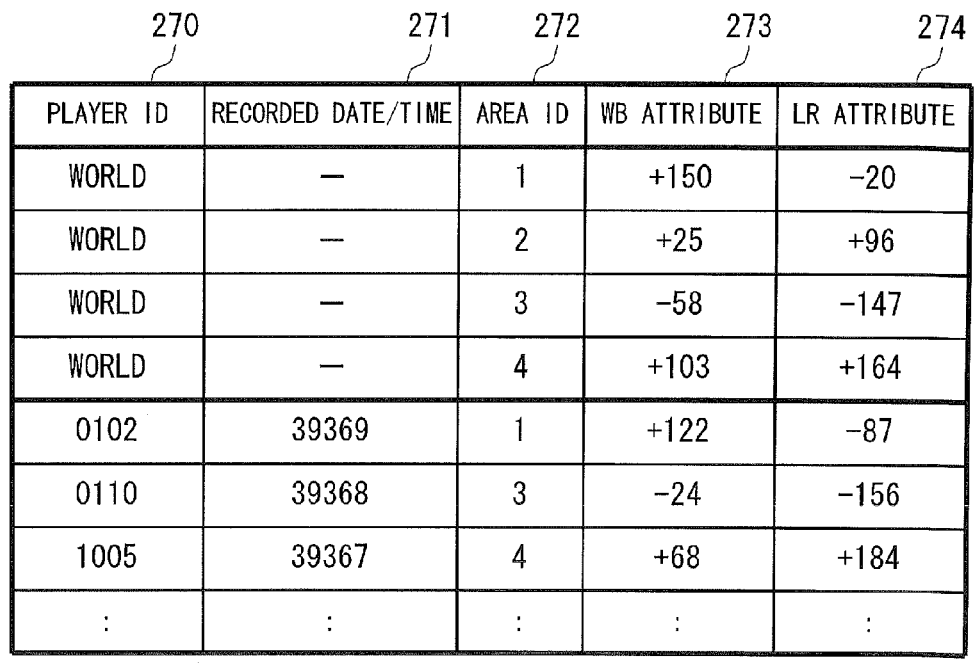
FIG. 7 shows exemplary data stored in an attribute storage unit.

FIG. 7 shows exemplary data stored in the attribute storage unit 260. The attribute storage unit 260 is provided with a player ID column (fields) 270, a recorded date and time column (fields) 271, an area ID column (fields) 272, a WB attribute column (fields), and an LR attribute column (fields) 274. The player ID fields 270 store the IDs of players for which an attribute is recorded. The recorded date and time fields 271 store the date and time that the attribute is recorded. The area ID fields 272 store the IDs of areas in which the attribute is recorded. The WB attribute fields 273 and the LR attribute fields 274 store the attribute of the game worlds as a whole and those of individual players, respectively. The WB attribute is increased as players play more in the interest of justice and is decreased as players play evil characters. The LR attribute denotes affinity with a specific character. In this embodiment, the parameters for controlling the game are determined by referring to these two attributes. Alternatively, only one or three or more attributes may be provided.

The tallying condition storage unit 262 stores a tallying condition for tallying the event information and calculating the attribute. FIG. 8 shows exemplary data stored in the tallying condition storage unit 262. The tallying condition storage unit 262 is provided with an event column (fields) 275, an area ID column (fields) 276, a WB attribute column (fields) 277, and an LR attribute column (fields) 278. For example, when the player generates an event "defeat enemy character A in the castle" in an area identified by area ID "1", "−10" is added to the WB attribute.

The change condition storage unit 264 stores a condition for changing the control parameters of the game in accordance with the attribute of the game world as a whole and the attributes of individual players. FIG. 9 shows exemplary data stored in the change condition storage unit 264. The change condition storage unit 264 is provided with an area ID column (fields) 280, a WB attribute column (fields) 281, an LR attribute column (fields) 282, and a control parameter column (fields) 283. For example, given that the WB attribute calculated by referring to the attribute of the game worlds as a whole and the attribute of the associated player is "+50" or greater, the "enemy character level", one of the control parameters, is increased by an increment of "+1".

An authentication unit 241 authenticates the game terminal 300 of the player. For example, the authentication unit 241 retrieves a player ID and a password for authentication from the game terminal 300 via the communication unit 230, and authenticates the game terminal 300 of the player by referring to the player database (not shown). When the authentication is successful, the authentication unit 241 registers the IP address of the game terminal 300 of the player in the player database. The game server 210 retrieves the event information of the game from the game terminal 300 of the player successfully authenticated, as described later, and notifies the terminal of a change in the control parameters of the game.

An event information retrieving unit 242 retrieves event information that varies with the progress of the game from the game terminal 300 of the player successfully authenticated by the authentication unit 241. A tallying unit 243 calculates the attribute from the event information retrieved by the event information retrieving unit 242 in accordance with the condition stored in the tallying condition storage unit 262 and stores the attribute in the attribute storage unit 260. A parameter change communicating unit 244 calculates the game control parameters in the individual game terminals, by referring to the attribute calculated by the tallying unit 243, and notifies the game terminal 300 of a change in the control parameters. The parameter change communicating unit 244 may communicate the attribute calculated by the tallying unit 243 to the game terminal 300 so that the game terminal 300 can calculate the control parameters for controlling the game and change the parameters.

An attribute presenting unit 245 reads the attribute of the game world as a whole from the attribute storage unit 260 and presents the attribute to the game terminal 300. The attribute presenting unit 245 may present the attribute of the game world as a whole to the game terminal 300 before the parameter change communicating unit 244 communicates a change in the parameters to the game terminal 300. This allows the player of the game terminal 300 to know the pattern underlying the game world as a whole beforehand and determine whether to accept the change in the parameters.

Figure 10:
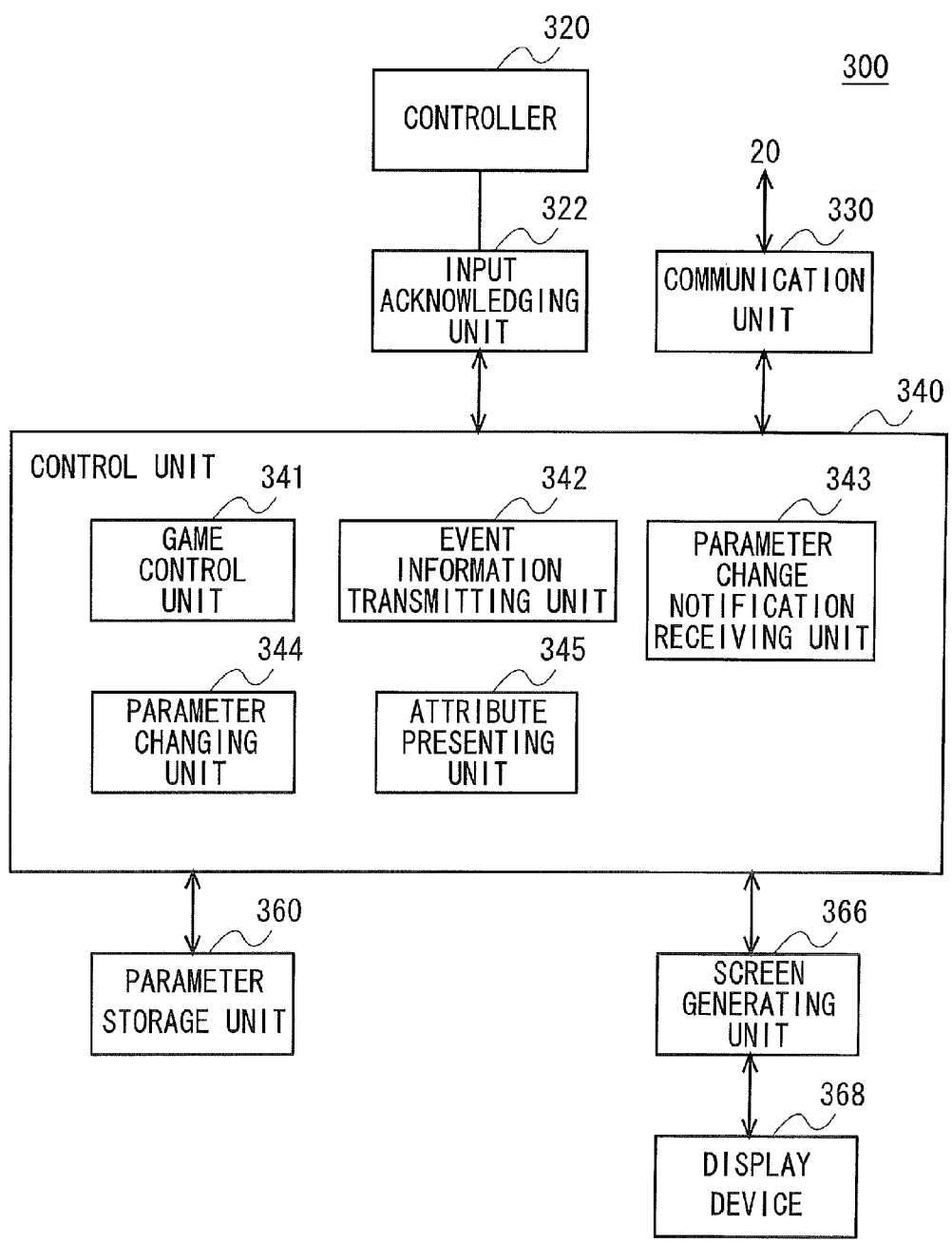
FIG. 10 shows the configuration of a game terminal according to the embodiment.

FIG. 10 shows the configuration of the game terminal 300 according to the embodiment. The game device 300 is provided with a controller 320, an input acknowledging unit 322, a communication unit 330, a control unit 340, a parameter storage unit 360, a screen generating unit 366, and a display device 368. The components may be implemented in a variety of manners by hardware only, software only, or a combination of thereof.

The input acknowledging unit 322 acknowledges a control signal from the controller 320 controlled by the player. The control unit 340 advances the game based on a control input from the player acknowledged by the input acknowledging unit 322. The parameter storage unit 360 stores various parameters necessary to advance the game such as control parameters for controlling the game, event information that varies with the progress of the game. The screen generating unit 366 generates a game screen controlled by the control unit 340 and causes the display device 368 to display the screen.

A game control unit 341 runs the game program and controls the progress of the game. The game control unit 341 reads the control parameters of the game stored in the parameter storage unit 360 and controls the game. The game control unit 341 also stores parameters such as event information in the parameter storage unit 360 with the progress of the game.

An event information transmitting unit 342 transmits the event information stored in the parameter storage unit 360 to the game server 210 according to a predetermined timing schedule. The event information transmitting unit 342 may transmit the event information to the game server 210 periodically, i.e., at predetermined time intervals. Alternatively, the unit 342 may transmit the event information to the game server 210 when the player starts playing in the area or stops playing in the area, when an event occurs, or when the game is cleared, etc. In addition to the event information or instead of the event information, the event information transmitting unit 342 may transmit other parameter that varies with the progress of the game to the game server 210.

A parameter change notification receiving unit 343 receives notification of a change of parameter from the game server 210. A parameter changing unit 344 changes a game control parameter stored in the parameter storage unit 360 in accordance with the parameter change notification received by the parameter change notification receiving unit 343. This changes the content of the game controlled by the game control unit 341. Parameters changed include attributes such as the physical strength level, experience value, magic point, capability values, clothing, shape data of the player's character or the enemy character. Parameters may also or alternatively include: the configuration of the game field; the type, location, probability of occurrence of items or enemy characters located in the game field; the type, details, location, probability of occurrence of events generated in the game field; the date and time, or day of the week in the game field; or the type or brightness of the screen generated by the screen generating unit 366.

Changing the parameters for controlling the game in accordance with notification of a change from the game server 210 allows the player to enjoy a game that is rich in variations. Thereby, a game is provided which arouses the player's interest and in which it less likely that the player feels bored.

An attribute presenting unit 345 retrieves from the game server 210 the attribute indicating the overall pattern of multiple game terminals 300, which serves as a criterion to change the parameters for controlling the game and which is calculated by tallying the event information retrieved from the multiple game terminals 300, and displays the parameter.

Figure 11:
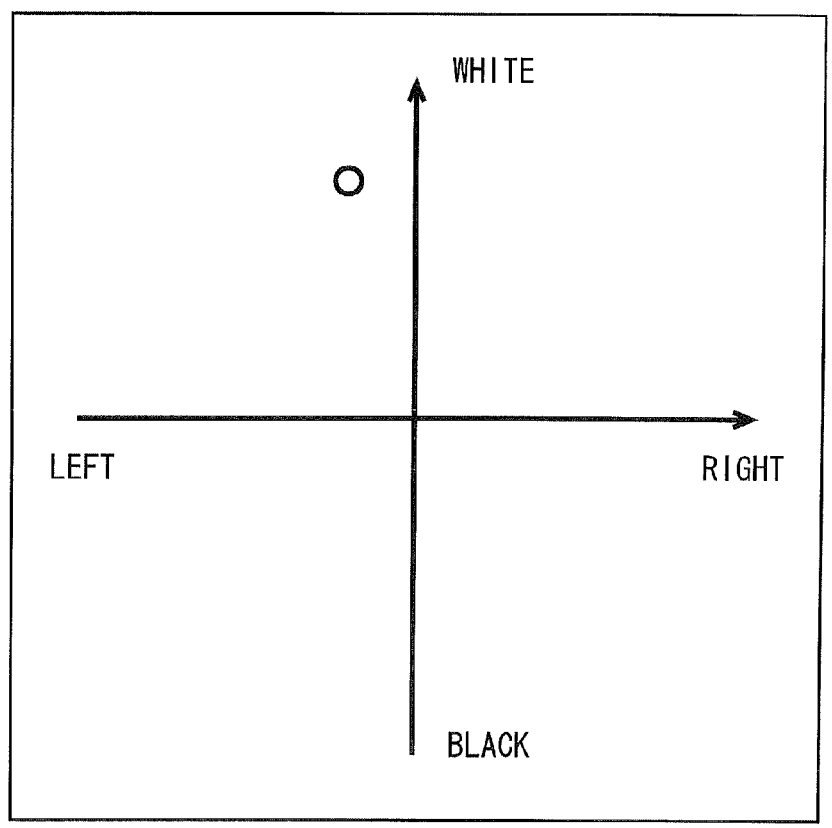
FIG. 11 shows an exemplary screen presented by an attribute presenting unit.

FIG. 11 shows an exemplary screen presented by the attribute presenting unit 345. When the game terminal 300 logs into the game server 210, the attribute presenting unit 345 retrieves the attribute of the game world as a whole in the area in which the player attempts to play, displaying a graph representation of the attribute, plotting the WB attributes on the vertical axis and LR attribute on the horizontal axis. This allows the player of the game terminal 300 to know the pattern underlying the game world as a whole beforehand and determine whether to accept the change in the parameters.

Described above is an explanation based on an exemplary embodiment. The embodiment is intended to be illustrative only and it will be obvious to those skilled in the art that various modifications to constituting elements and processes could be developed and that such modifications are also within the scope of the present invention.

[Description of the Reference Numerals]

10 game server, 20 Internet, 30 communication unit, 40 control unit, 41 authentication unit, 42 multiplayer play request acknowledging unit, 43 friendly mode matching unit, 44 hostile mode matching unit, 45 play data acquiring unit, 46 play data delivering unit, 47 message registration acknowledging unit, 48 message delivering unit, 49 message evaluation unit, 60 player database, 62 message database, 64 play data storage unit, 100 game device, 140 control unit, 141 single player play control unit, 142 multiplayer play request transmitting unit, 143 multiplayer play control unit, 144 play data transmitting unit, 145 play data receiving unit, 146 play data playback unit, 147 message registration unit, 148 message receiving unit, 149 message displaying unit, 160 parameter storage unit, 166 screen generating unit, 168 display device, 240 control unit, 241 authentication unit, 242 event information acquiring unit, 243 tallying unit, 244 parameter change communicating unit, 245 attribute presenting unit, 260 attribute storage unit, 262 tallying condition storage unit 262 change condition storage unit, 300 game terminal, 330 communication unit, 340 control unit, 341 game control unit, 342 event information transmitting unit, 343 parameter change notification receiving unit, 344 parameter changing unit, 345 attribute presenting unit, 360 parameter storage unit The present invention can be used in a game device configured to control a game played by multiple players.

The invention claimed is:

1. A game control program product embedded in a non-transitory computer-readable medium, comprising:
a module operative to control a game where a player controls a player's character and advances in a game field;
a module operative to acquire play data of another player of the game and information on a position within the game field where the play data is registered, from a game server adapted to manage the play data over a network, the play data indicating the status of progress of the game in the game field; and
a module operative to display the play data when the player's character is located within a predetermined range from the position where the play data is registered, wherein:
the play data includes data indicating the behavior of a player's character of another game device, and
the module for displaying displays the player's character of said another game device in a display mode different from that of the player's character of the game device as controlled.

2. The game control program product according to claim 1, wherein
the play data includes replay data indicating the position of the player's character of said another game device and recorded at predetermined time intervals, and
the module for displaying displays the player's character of said another game device by locating the player's character of said another game device in the game field based on the data indicating the position.

3. A game control program product embedded in a non-transitory, computer-readable storage medium, comprising:
a module operative to control a game where a player controls a player's character and advances in a game field;
a module operative to acquire play data of another player of the game and information on a position within the game field where the play data is registered, from a game server adapted to manage the play data over a network, the play data indicating the status of progress of the game in the game field; and
a module operative to display the play data when the player's character is located within a predetermined range from the position where the play data is registered, wherein:
the play data includes data indicating the position of the player's character of another game device occurring when the game was over in said another game device, and
the module for displaying displays a mark indicating that the game was over in said another game device at a position of the player's character of said another game device where the game was over.

4. The game control program product according to claim 3, wherein the play data includes data indicating the behavior of the player's character of another game device occurring when the game is about to be over.

5. A game device comprising:
a control unit operative to control a game where a player controls a player's character and advances in a game field;
an acquiring unit operative to acquire play data of another player of the game and information on a position within the game field where the play data is registered, from a game server adapted to manage the play data over a network, the play data indicating the status of progress of the game in the game field; and
a display unit operative to display the play data when the player's character is located within a predetermined range from the position where the play data is registered, wherein:
the play data includes data indicating the behavior of a player's character of another game device, and
the display unit displays the player's character of said another game device in a display mode different from that of the player's character of the game device as controlled.

6. A game control method comprising:
controlling a game where a player controls a player's character and advances in a game field;
acquiring play data of another player of the game and information on a position within the game field where the play data is registered, from a game server adapted to manage the play data over a network, the play data indicating the status of progress of the game in the game field; and
displaying the play data when the player's character is located within a predetermined range from the position where the play data is registered, wherein:

the play data includes data indicating the behavior of a player's character of another game device, and the displaying includes displaying the player's character of said another game device in a display mode different from that of the player's character of the game device as controlled.

7. A non-transitory, computer readable recording medium having embodied thereon the game control program product, the game control program product comprising:

a module operative to control a game where a player controls a player's character and advances in a game field;

a module operative to acquire play data of another player or of the game and information on a position within the game field where the play data is registered, from a game server adapted to manage the play data over a network, the play data indicating the status of progress of the game in the game field; and a module operative to display the play data when the player's character is located within a predetermined range from the position where the play data is registered, wherein:

the play data includes data indicating the behavior of a player's character of another game device, and the module for displaying displays the player's character of said another game device in a display mode different from that of the player's character of the game device as controlled.

8. A game control program product embedded in a non-transitory computer-readable medium, comprising:

a module operative to acquire, from a game device adapted to control a game where a player controls a player's character and advances in a game field, play data including data indicating the behavior of a player's character of the game device or data indicating the position of the player's character of the game device occurring when the game was over in the game device and information on a position where the play data is registered;

a module operative to refer to a player database storing information on positions of the player's characters of a plurality of game devices in the game field and to select a player that controls a player's character located within a predetermined range from the acquired position in the game field where the play data is registered; and a module operative to deliver the acquired play data to the game device of the selected player.

9. The game control program product according to claim 8, wherein the player database further stores levels of players, and the module for selecting selects a player at a level different from that of the player acquiring the play data by a predetermined amount or less.

10. A game server comprising:

an acquiring unit operative to acquire, from a game device adapted to control a game where a player controls a player's character and advances in a game field, play data including data indicating the behavior of a player's character of the game device or data indicating the position of the player's character of the game device occurring when the game was over in the game device and information on a position where the play data is registered;

a selection unit operative to refer to a player database storing information on positions of the player's characters of a plurality of game devices in the game field and to select a player that controls a player's character located within a predetermined range from the acquired position in the game field where the play data is registered; and a delivery unit operative to deliver the acquired play data to the game device of the selected player.

11. A game control method comprising:

acquiring, from a game device adapted to control a game where a player controls a player's character and advances in a game field, play data including data indicating the behavior of a player's character of the game device or data indicating the position of the player's character of the game device occurring when the game was over in the game device and information on a position where the play data is registered;

referring to a player database storing information on positions of the player's characters of a plurality of game devices in the game field and selecting a player that controls a player's character located within a predetermined range from the acquired position in the game field where the play data is registered; and delivering the acquired play data to the game device of the selected player.

12. A non-transitory, computer readable recording medium having embodied thereon the game control program product, the game control program product comprising:

a module operative to acquire, from a game device adapted to control a game where a player controls a player's character and advances in a game field, play data including data indicating the behavior of a player's character of the game device or data indicating the position of the player's character of the game device occurring when the game was over in the game device and information on a position where the play data is registered;

a module operative to refer to a player database storing information on positions of the player's characters of a plurality of game devices in the game field and to select a player that controls a player's character located within a predetermined range from the acquired position in the game field where the play data is registered; and a module operative to deliver the acquired play data to the game device of the selected player.

13. A game device comprising:

a control unit operative to control a game where a player controls a player's character and advances in a game field;

an acquiring unit operative to acquire play data of another player of the game and information on a position within the game field where the play data is registered, from a game server adapted to manage the play data over a network, the play data indicating the status of progress of the game in the game field; and a display unit operative to display the play data when the player's character is located within a predetermined range from the position where the play data is registered, wherein the play data includes data indicating the position of the player's character of another game device occurring when the game was over in said another game device, and the display unit displays a mark indicating that the game was over in said another game device at a position of the player's character of said another game device where the game was over.

14. A game control method comprising:

controlling a game where a player controls a player's character and advances in a game field;

acquiring play data of another player of the game and information on a position within the game field where the play data is registered, from a game server adapted to manage the play data over a network, the play data indicating the status of progress of the game in the game field; and displaying the play data when the player's character is located within a predetermined range from the position where the play data is registered, wherein the play data includes data indicating the position of the player's character of another game device occurring when the game was over in said another game device, and said displaying includes displaying a mark indicating that the game was over in said another game device at a position of the player's character of said another game device where the game was over.

* * * * *